US006963626B1

(12) United States Patent
Shaeffer et al.

(10) Patent No.: US 6,963,626 B1
(45) Date of Patent: Nov. 8, 2005

(54) NOISE-REDUCING ARRANGEMENT AND METHOD FOR SIGNAL PROCESSING

(75) Inventors: K. Derek Shaeffer, Menlo Park, CA (US); Theresa H. Meng, Portola Valley, CA (US); Thomas H. Lee, Cupertino, CA (US); Sydney Reader, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/310,598

(22) Filed: May 12, 1999

Related U.S. Application Data

(60) Provisional application No. 60/102,865, filed on Oct. 2, 1998.

(51) Int. Cl.[7] .................................................. H04B 1/10
(52) U.S. Cl. ..................... 375/346; 455/343.1; 455/574
(58) Field of Search ................................ 375/216, 346, 375/340, 350; 455/343.1, 343.4, 574

(56) References Cited

U.S. PATENT DOCUMENTS

| 4,271,488 | A |   | 6/1981  | Saxe          |         |
|-----------|---|---|---------|---------------|---------|
| 4,544,914 | A |   | 10/1985 | Chan et al.   |         |
| 4,667,311 | A |   | 5/1987  | Ul Haq et al. |         |
| 4,746,899 | A |   | 5/1988  | Swanson et al.|         |
| 4,882,712 | A |   | 11/1989 | Ohno et al.   |         |
| 4,961,184 | A |   | 10/1990 | Owen          |         |
| 4,991,172 | A | * | 2/1991  | Cidon et al.  | 370/400 |
| 5,047,665 | A |   | 9/1991  | Burt          |         |
| 5,065,157 | A |   | 11/1991 | Ribner et al. |         |
| 5,144,525 | A |   | 9/1992  | Saxe et al.   |         |
| 5,146,617 | A |   | 9/1992  | Moen, Jr.     |         |
| 5,200,983 | A |   | 4/1993  | Kogan         |         |
| 5,294,928 | A | * | 3/1994  | Cooper et al. | 327/544 |

(Continued)

FOREIGN PATENT DOCUMENTS

| EP | 447302 A1 | * | 9/1991 | ............ H04B/1/16 |
| EP | 447302    | * | 9/1991 | ............ H04B/1/16 |

OTHER PUBLICATIONS

Shaeffer, et al., "A 115mW CMOS GPS Receiver", 1998 IEEE International Solid–State Circuits Conference, Feb. 6, 1998, pp 122–123.

Chada, Kanwar, "The Global Positioning System: Challenges in Bringing GPS to Mainstream Consumers", 1998 IEEE International Solid–State Circuits Conference, Feb. 5, 1998, pp 26–28.

Sanielevici, S., et al., "A 900 MHz Transceiver Chipset for Two–Way Paging Applications, " *IEEE Journal of Solid–State Circuits*, vol 33, Dec. 1998, Figure 1 (Front–end) and Figure 2 (Baseband).

*Primary Examiner*—Khai Tran
*Assistant Examiner*—David B. Lugo

(57) ABSTRACT

A communication system uses analog and digital circuits along the same data path in a manner that permits the analog circuitry to avoid adverse affects caused by the digital circuitry. Consistent with one embodiment directed to a signal processing system that detects faint incoming signals, the analog and digital circuits are implemented on a single piece of silicon. In such signal processing systems, noise generated by digital processing blocks can degrade the performance of sensitive analog portions. The effective noise is reduced by causing the analog and digital portions of the system to function during separate time intervals. The noise-generating portions of the system may then be turned off during a first data-communication interval while the analog block operates. The data acquired during this period is stored for subsequent processing by the digital portion during a second shorter data-communication interval. Other aspects are applicable to reception arrangements in which part of the incoming signal may be disregarded without significant degradation in performance of the rest of the system, and other aspects are directed to transmission arrangements in which the inverse of the above reception arrangement is used.

22 Claims, 4 Drawing Sheets

*TIME-INTERLEAVED RECEIVER ARCHITECTURE. THE TIMING CONTROLLER REGULATES THE RECEIVER OPERATION BETWEEN THE ANALOG RECEIVER FRONT-END CIRCUITRY AND THE BASEBAND PROCESSING. IT ALSO CONTROLS THE MEMORY IN PERFORMING TIME-INTERLEAVING READ/WRITE OPERATIONS.*

U.S. PATENT DOCUMENTS

| | | | |
|---|---|---|---|
| 5,307,066 A | 4/1994 | Kobayashi et al. | |
| 5,317,183 A | 5/1994 | Hoffman et al. | |
| 5,373,293 A | 12/1994 | Hirata | |
| 5,422,807 A | 6/1995 | Mitra et al. | |
| 5,426,392 A | 6/1995 | Kornfeld | |
| 5,475,255 A | 12/1995 | Joardar et al. | |
| 5,485,029 A | 1/1996 | Crabbe et al. | |
| 5,586,149 A | 12/1996 | Connell et al. | |
| 5,594,279 A | 1/1997 | Itou et al. | |
| 5,604,500 A | 2/1997 | Murakami | |
| 5,623,159 A | 4/1997 | Monk et al. | |
| 5,640,047 A | 6/1997 | Nakashima | |
| 5,640,161 A | 6/1997 | Johnson et al. | |
| 5,649,160 A | 7/1997 | Corry et al. | |
| 5,649,166 A | 7/1997 | Saldanha et al. | |
| 5,675,337 A | 10/1997 | Moriyama | |
| 5,706,004 A | 1/1998 | Yeung | |
| 5,719,572 A | 2/1998 | Gong | |
| 5,747,982 A | 5/1998 | Dromgoole et al. | |
| 5,754,601 A | 5/1998 | Horng et al. | |
| 5,764,074 A | 6/1998 | Wykes et al. | |
| 5,767,561 A | 6/1998 | Frei et al. | |
| 5,841,396 A * | 11/1998 | Krasner | 342/357.02 |
| 5,912,644 A * | 6/1999 | Wang | 342/457 |
| 5,959,980 A * | 9/1999 | Scott | 370/280 |
| 6,138,190 A * | 10/2000 | Nordling | 710/29 |
| 6,300,899 B1 * | 10/2001 | King | 342/357.12 |
| 6,381,229 B1 * | 4/2002 | Narvinger et al. | 370/328 |

* cited by examiner

RECEIVER BLOCK DIAGRAM

TRANSMITTER BLOCK DIAGRAM

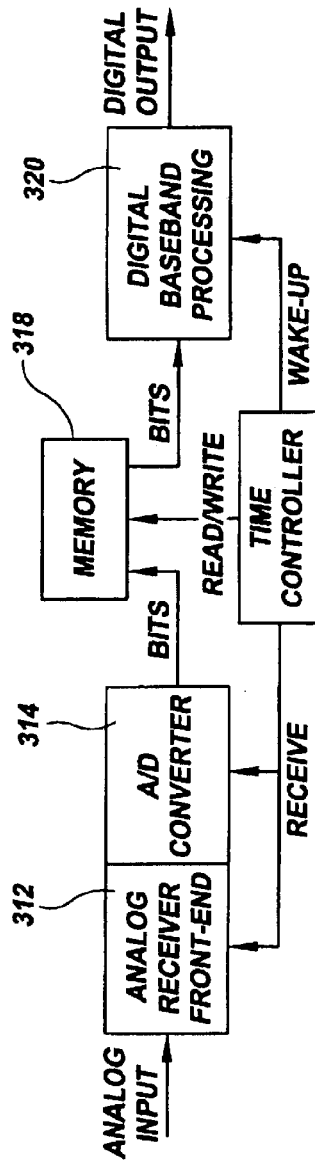

FIG. 3 TIME-INTERLEAVED RECEIVER ARCHITECTURE. THE TIMING CONTROLLER REGULATES THE RECEIVER OPERATION BETWEEN THE ANALOG RECEIVER FRONT-END CIRCUITRY AND THE BASEBAND PROCESSING. IT ALSO CONTROLS THE MEMORY IN PERFORMING TIME-INTERLEAVING READ/WRITE OPERATIONS.

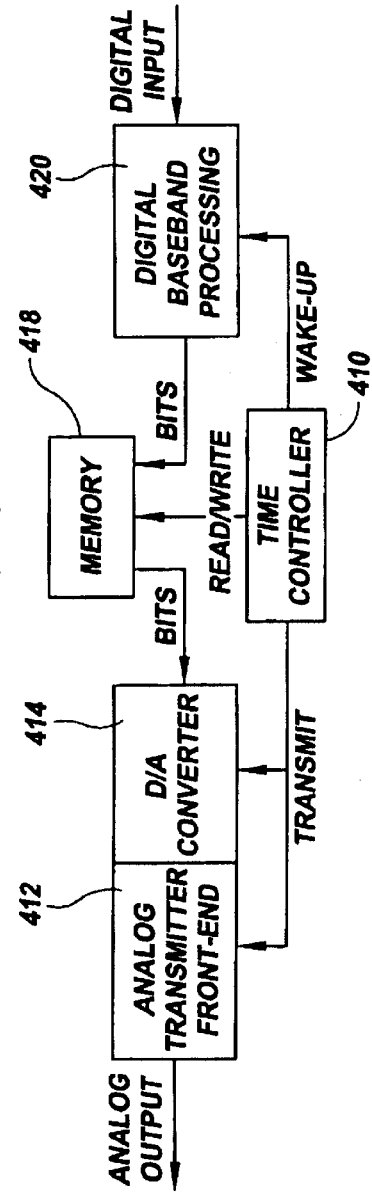

FIG. 4 TIME-INTERLEAVED TRANSMITTER ARCHITECTURE. THE TIMING CONTROLLER REGULATES THE TRANSMITTER OPERATION BETWEEN THE ANALOG TRANSMITTER FRONT-END CIRCUITRY AND THE BASEBAND PROCESSING. IT ALSO REGULATES THE MEMORY IN PERFORMING TIME-INTERLEAVING READ/WRITE OPERATIONS.

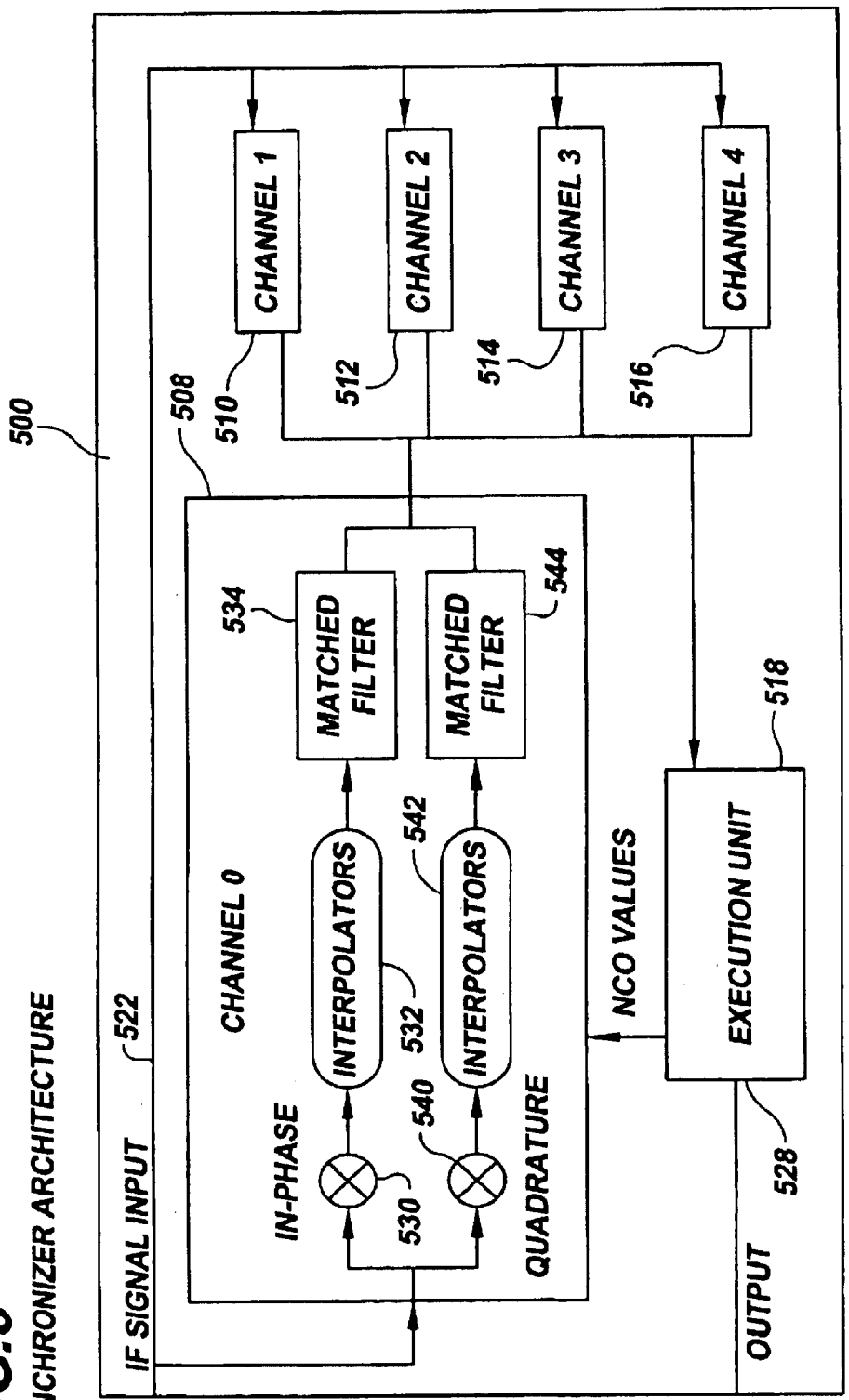
FIG. 5 SYNCHRONIZER ARCHITECTURE

EXECUTION UNIT DATAPATH

NOISE-REDUCING ARRANGEMENT AND METHOD FOR SIGNAL PROCESSING

RELATED PATENT DOCUMENTS

This application claims the benefit of U.S. Provisional Application Ser. No. 60/102,865, filed on Oct. 2, 1998, and entitled "Noise-Reducing Arrangement And Method For Signal Processing."

BACKGROUND STATEMENTS

Inventive aspects disclosed herein were made with Government support under contract N65236-96-C-8608. The Government has certain rights in these inventive aspects.

BACKGROUND STATEMENTS

Inventive aspects disclosed herein were made with Government support under contract N65236-96-C-8608. The Government has certain rights in these inventive aspects.

FIELD OF THE INVENTION

The present invention relates generally to signal communication. More particularly, the present invention relates to signal communication involving digital signal processing circuitry operating at speeds that generate noise sufficient to adversely affect nearby analog circuitry that is processing the same data.

BACKGROUND OF THE INVENTION

Many signal processing systems are designed to detect, receive and process data sent in the form of low-energy incoming analog signals. Front-end analog circuitry is typically used to detect the presence of the signal and to convert the signals to useable digital data. These signal processing systems then use digital signal processing circuitry to decode, interpret and/or further process the data for subsequent applications.

As with many other electronic systems, there have been ongoing efforts to reduce the cost and size of such signal processing systems. These efforts have included, for example, implementing such systems using circuits integrated into as few chips as possible and consuming as little power as possible. For convenience and general operational requirements, these systems have also carried the burden of operating at extremely high speeds. For this reason, high-speed digital signal processors have been specially designed and included as a significant part of the digital processing circuitry to accommodate these demands.

Such communication systems including these high-speed digital signal processors have encountered a serious noise problem when attempting to implement the analog circuitry nearby the digital signal processing circuitry. The noise generated by digital signal processing circuitry has denigrated the performance of sensitive circuits in the analog circuitry. Traditionally, this problem has been primarily addressed by implementing the digital signal processing circuitry and the analog circuitry on separate chips, so that the noise generated by the digital signal processing circuitry is isolated from the analog circuitry.

This problem is being currently encountered by receiver circuitry for the Global Position System (GPS). GPS provides a data stream that is expected to be used in a wide variety of portable, mobile electronic devices. To accommodate demands to shrink feature sizes, reduce power-consumption, and package using lightweight components, it is desirable to integrate a GPS receiver onto a single die. Unfortunately, a major design issue in mixed-signal systems of this type is the adverse effect of digital switching noise coupled through the substrate to sensitive analog circuits.

Accordingly, a need exists for communication arrangements and methods that address the demands of the marketplace and overcome the above-mentioned problems.

SUMMARY OF THE INVENTION

Various implementations of the present invention reduce the effective noise by causing the analog and digital portions of the system to function during separate time intervals. According to certain embodiments, the noise-generating portions of the system are turned off while the analog block operates. The data acquired during this period is stored for subsequent processing by the digital portion. This technique is applicable to systems in which part of the incoming signal may be disregarded without significant degradation in performance of the rest of the system. It is also advantageous in situations where other design considerations, such as cost or power consumption, enhance the noise problem.

One particular example embodiment of the present invention is directed to a communication arrangement having analog circuitry and digital signal processing circuitry, where the analog circuitry is susceptible to processing corrupted data due to noise coupled thereto via digital signal processing circuitry. The embodiment is a method for reducing noise passed from the digital signal processing circuitry, comprising the steps of: using the analog circuitry to process data during a first data-communication interval while the digital signal processing circuitry is in a reduced activity mode; and effectively disabling the processing of data by the analog circuitry during a second shorter data-communication interval while processing the data with the digital signal processing circuitry.

In a more specific embodiment, the method is used in connection with receiving incoming data, and in yet another specific embodiment, the method is used in connection with transmitting data.

In a more specific application of the present invention involving analog data transmitted in frames with a guard time between frames, the method further includes using the analog circuitry to receive and process data during valid-data frame periods and processing the data with the digital signal processing circuitry during the guard periods. In this manner, little or no data is lost when effectively disabling the processing of data by the analog circuitry.

Another particular embodiment of the invention is in the form of a communication arrangement that is susceptible to processing corrupted data due to high-speed data processing. The arrangement comprises: a chip including both digital signal processing circuitry and analog circuitry, the digital signal processing circuitry having a reduced activity mode and a high-speed data processing mode, and the analog circuitry configured and arranged to process data during a first data-communication interval while the digital signal processing circuitry is in the reduced activity mode. The processing of data by the analog circuitry is effectively disabled during a second shorter data-communication interval while processing the data with the digital signal processing circuitry.

Yet another embodiment of the present invention is directed to a communication arrangement having analog circuitry and digital signal processing circuitry, where the analog circuitry coupled to receive streams of data presented thereto in the form of high-frequency signals for subsequent processing by the digital signal processing circuitry. Noise passed from the digital signal processing circuitry to the data is reduced using a method as follows: using the analog circuitry to process and to store the data during a first data-communication interval while the digital signal processing circuitry is in a reduced activity mode; and disregarding additional data in the streams of data presented to the analog circuitry during a second shorter data-communication interval while processing the stored data with the digital signal processing circuitry.

Other aspects of the present invention are directed to implementations involving: distinct frames for the analog and digital blocks; use of a memory as a coupler between two non-simultaneously active blocks; use of two access rates for the memory to permit the digital rate to be adjusted per the need of the analog section or per the need of optimizing the time during which the digital section is operated in each timing cycle; and time slot coordination to permit flexibility of time-slot assignment and dynamic adjustment of that assignment.

Other particular embodiments of the present invention are directed to methods, apparatuses and specific aspects relating to the above-characterizations.

BRIEF DESCRIPTION OF THE DRAWINGS

Various aspects and advantages of the present invention will become apparent upon reading the following detailed description of various embodiments and upon reference to the drawings in which:

FIG. 3 is another block diagram of a receiver architecture, implemented according to an example embodiment of the present invention;

FIG. 4 is another block diagram of a transmitter architecture, implemented according to an example embodiment of the present invention;

FIG. 5 is a block diagram of a receiver, implemented according to another example embodiment of the present invention, for use with a GPS system;

Figure 1:
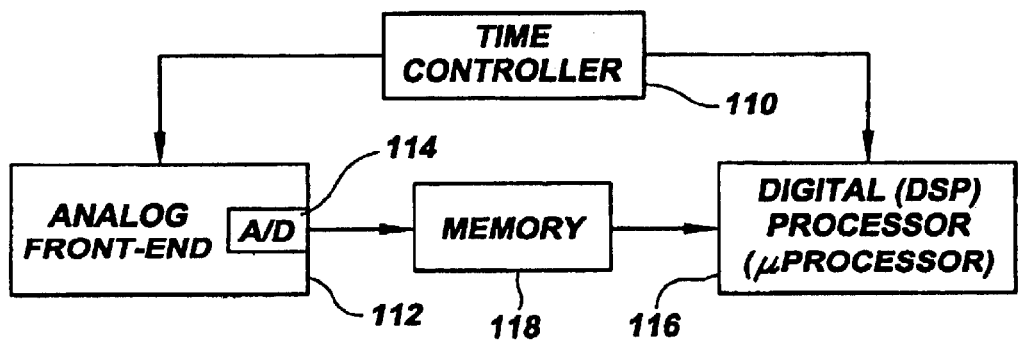
FIG. 1 is a general block diagram of a receiver, implemented according to an example embodiment of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

DETAILED DESCRIPTION

The present invention is believed to be applicable to a variety of systems and arrangements that process data using both analog and digital processing circuitry. The present invention has been found to be particularly advantageous for systems in which part of the incoming data signal may be disregarded without significant degradation in system performance and/or where cost or power consumption is of concern, or in which the timing control of the analog and digital sections of a circuit can be implemented without loss of analog data. An appreciation of the invention may be ascertained through a discussion in the context of such system applications.

In a typical application of the present invention, a communication arrangement includes both analog circuitry and digital signal processing circuitry for communicating data. The analog circuitry couples to the digital circuitry using conventional analog-digital or analog-digital conversion circuitry. In certain implementations of the present invention, the analog circuitry includes IF (intermediate frequency) and/or higher-frequency signaling circuitry that is arranged to couple data between an antenna and the digital circuitry. In other implementations of the present invention, the analog circuitry includes low-power signal-sensitive circuitry that is arranged to couple data between a peripheral device, such as a disc drive, and the digital circuitry. Each of these example implementations involves digital signal processing circuitry operating at clock speeds that are sufficiently high, relative to the sensitivity of the analog circuitry. Such digital signal processing circuitry can take on a number of forms, for example, using programmable logic, semi-programmable logic, digital signal processors, and/or combinations of the circuit types. Regardless of its implementation form, the noise generated by the digital signal processing circuitry can corrupt the data being processed by the analog circuitry.

To significantly reduce, and in many implementations eliminate, this data corruption susceptibility, the present invention uses a storage medium between the analog circuitry and the digital signal processing circuitry along with a timing controller to effectively disable the analog circuitry while the digital signal processing circuitry processes the data in connection with the storage medium. For example, while the digital signal processing circuitry processes the data and is permitted to generate potentially data-corrupting noise, the timing controller can block the ability of the analog circuitry to access (read or write) the storage medium. Alternatively, while the digital signal processing circuitry processes the data and is permitted to generate potentially data-corrupting noise, the timing controller can block the ability of the storage medium to bring in additional valid data; for example, by disabling a "write" enable port to the memory, by marking the "good" data point within the memory, and/or by freezing a memory location pointer to the "good" data (as in a first-in-first-out (FIFO) or dual-access memory implementation). Additionally, during this period digital processing period, the timing controller can implement a power-saving (low-power or no-power) mode for the analog circuitry.

While the analog circuitry processes data, various implementations can be used to control noise-generating aspects of the digital signal processing circuitry. For instance, during this period, the timing controller can implement a power-saving mode for the digital circuitry by removing power to the digital circuitry altogether or by removing power to selected circuits that drive the digital circuitry such as selected high-speed clock circuits. When such high-speed clock circuits are disabled, a synchronized slow-speed (non-interfering) clock can be simultaneously activated in its place. Other alternative timing control implementations can depend on the design requirements. For example, viewing the storage medium as a bridge interface, the timing controller can be implemented in a manner similar to control implementations controlling either side of a PCI bridge, as is well known in the art.

Such implementations of the present invention are particularly advantageous for implementing both the analog circuitry and the digital signal processing circuitry on a single substrate (or chip), where the substrate acts as the conduit for data-corrupting noise. The present invention is also useful for non-monolithic implementations where noise can also be a concern. These non-monolithic implementations include, for example, multi-chip modules where the analog and digital functions are separated on different chips and/or printed circuitry, with the coupling storage medium being implemented separate from or part of either the analog or digital block (chip or printed circuit board).

For many implementations consistent with the present invention, the digital circuitry is operated at a speed that is high relative to the operating speed of the analog circuitry. Thus, the data throughput for the digital circuitry exceeds the data throughput for the analog circuitry. This permits the overall on-time, and therefore the power consumption, of the digital circuitry to be minimized relative to the analog block, the latter of which can be more complex in terms of power and signal synchronization control. The differences in data throughput, between the analog circuitry and the digital circuitry, vary depending on the application. In a less data-intensive application, for instance, the analog circuitry is on during time periods constituting at least fifty percent of the time, whereas the digital circuitry is on during other time periods constituting no more than fifty percent of the time. In yet another example application in which the need to process data regularly is relatively intense, the analog circuitry is on for about ninety percent of the time, whereas the digital circuitry is on for about ten percent of the time. In each of these example data-receive applications, data is written to the memory by the analog circuitry at a relatively slow rate and read from the memory by the digital circuitry at a relatively fast rate; such a memory can be referred to as a slow-in-fast-out (SIFO) memory. In data-transmit applications, data is read from the memory for transmission by the analog circuitry at a relatively slow rate and written to the memory by the digital circuitry at a relatively fast rate; such a memory can be referred to as a fast-in-slow-out (FISO) memory.

As shown in the example receiver embodiment of FIG. 1, this can be accomplished using a time controller 110 between the analog circuitry and the digital processing circuitry. In this implementation, the analog circuitry is implemented as an analog front end block 112 including an analog-to-digital converter 114, and the digital processing circuitry is implemented as a circuit including digital signal processor (DSP) or microprocessor 116. A memory 118 is used to receive data from the analog circuitry while the noise-generating circuits of the digital processing circuitry are effectively disabled. After the analog circuitry has collected and stored sufficient data in the memory 118, as commanded by the timer controller 110, the noise-generating circuits of the digital processing circuitry are enabled to permit the retrieval and digital processing of the stored data.

Figure 2:
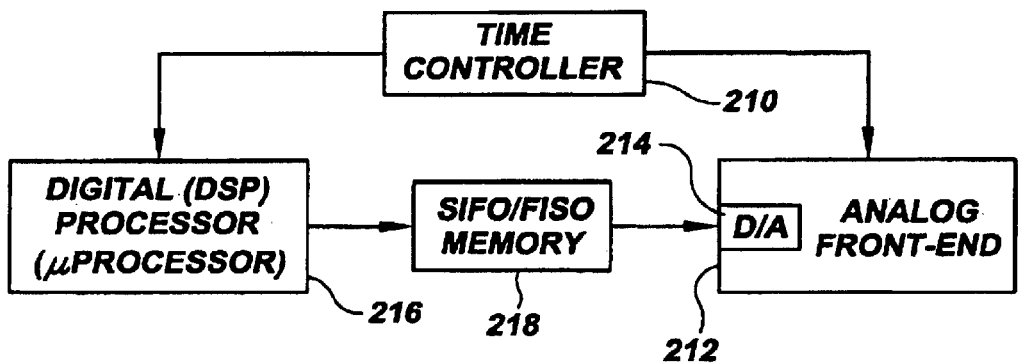
FIG. 2 is a general block diagram of a transmitter, implemented according to an example embodiment of the present invention.

FIG. 2 illustrates a similar implementation but for a transmitter. In this example implementation, a time controller 210 between the analog circuitry and the digital processing circuitry. The analog circuitry is implemented as an analog front end block 212 including a digital-to-analog converter 214, and the digital processing circuitry is implemented as a circuit including a digital signal processor (DSP) or microprocessor 216. A memory 218 is used to receive data from the analog circuitry while the noise-generating circuits of the digital processing circuitry are disabled. After the digital circuitry has stored sufficient data in the memory 218, the timer controller 210 disables the noise-generating circuits of the digital processing circuitry and permits the analog circuitry 212 to retrieve and process the stored data.

In a particular example implementation of the present invention, the time controller 110 or 210 is implemented as a programmable-digital timer chip that is frame-synchronized, such as through a phase-locked loop or delay-locked loop, to shut down the noise generation of the digital circuitry, or the digital circuitry altogether as the design may dictate.

According to a more specific implementation of the present invention, one or both of the above-illustrated implementations are used in connection with radio communication. In this implementation, the analog circuitry shown in FIGS. 1 and 2 includes the necessary circuitry for coupling the analog signal to an antenna. The digital circuitry in this implementation includes a digital baseband processor used for processing the signals for direct coupling to/from the antenna, or other transmission line. In other radio-directed implementations consistent with the present invention, the analog circuitry of FIGS. 1 and 2 includes circuitry, such as IF mixing circuitry, for coupling the analog signal from/to higher frequencies before interfacing with the transmission line. As indicated previously, the digital circuitry can be implemented in forms other than using a DSP or microprocessor.

In applications where the incoming or outgoing data does not need to be processing data on a full-time basis, certain example implementations of the present invention permit can be particularly advantageous. Consider, for example, reading data from a disc drive, or writing data to a disc drive. In the reading application, the analog circuitry can be used to read and store into a large memory portions of disc drive data while the high-speed digital circuitry is on for only those small periods of time necessary to extract and process the stored data for later use. As the large memory begins to fill, the reading cycle from the disc drive is paused while the high-speed digital circuitry extracts and processes the stored data. Alternatively, as the large memory begins to fill, the location on the disc drive for data already read into the memory is recorded for subsequent reading by the analog circuitry so as to permit access and extraction of the data in memory by the high-speed digital circuitry. This is one of a number of example data-transfer applications, where the proportions of on and off time for the analog and digital circuitry are not critical and the application can permit variances of the digital circuitry being on or off for more than fifty percent of the time with the analog circuitry being off or on for the remaining time.

Further, in connection with such applications that are not data intense, the storage medium between the analog and digital circuitry can be implemented in analog form, in a manner that does not generate significant amounts of noise. This implementation, as well as other implementations using analog memory blocks for processing of high-data intense applications, requires an analog-to-digital converter on the digital side of the storage medium. For further information concerning analog memory units, reference may be made to U.S. Pat. No. 4,271,488, entitled "High-speed Acquisition System Employing an Analog Memory Matrix." Other memory units useful for implementations in connection with the present invention are discussed in connection with the following U.S. Patents, U.S. Pat. Nos. 5,200,983 and 5,144,525, respectively entitled "FISO Analog Signal Acquisition System Employing CCD Array Storage," and "Analog Acquisition System Including a High Speed Timing Generator."

In the disc-drive writing application, analogous operations are implemented as discussed above in connection with the transmitter implementation of FIG. 2.

The type of implementation is not limited to magnetic-recording media. Other media forms, including compact discs, can also be addressed by the present invention as described above and also by repeating (rather than pausing) the data play mode to permit the digital circuitry to withdraw the data stored in the memory.

Also in accordance with the present invention and in applications where the analog circuitry need not receive and process data on a full-time basis, another important implementation is directed to an architecture for the digital signal synchronization and acquisition portion of a single-chip Global Positioning System (GPS) receiver system. The architecture implements a direct-sequence spread spectrum digital receiver, that accepts sampled intermediate frequency (IF) input data. The receiver can synchronize many (in one example, five) GPS satellite signals, and output raw data to a navigational processor.

In large mixed-signal systems, significant digital switching noise couples to the substrate, seriously affecting sensitive analog circuits. This can result in self-jamming of the GPS receiver. Partitioning the analog acquisition and digital processing into separate blocks of time eliminates the effects of the digital noise. According to a specific implementation of the present invention, a memory circuit is used to store acquired data that is to be processed when the digital section is subsequently re-enabled (or reactivated). The memory, which can be a digital circuit or an analog circuit, is designed to generate as little substrate noise as possible, minimizing the interference to the analog front end. For instance, one memory implementation uses a large block of small-scaled memory cells that do not require a noisy refresh circuit. Another more specific implementation of such a memory cell block is described and illustrated in connection with U.S. patent application Ser. No. 09/092,449, filed Jun. 5, 1998, now U.S. Pat. No. 6,229,161 and entitled "Semiconductor Current-Switching Device Having Operations Enhancer and Method Therefor," incorporated herein by reference in its entirety.

The GPS data stream has a low (50 bits per second) data rate and continuous repetition that offers the possibility of trading signal for decreased digital noise. Partitioning the receiver system allows the processing speed of the digital portion to be increased, while the analog portion runs longer and acquires more data. This increase in performance will generally come at the expense of power consumption, if for no other reason, because signal processing needs to be completed in a shorter amount of time. As a particular implementation, FIG. 1 is directed to receiving and processing a GPS data stream, with the analog front end block 112 acquiring data from an antenna and storing the data in the SIFO memory 118 during alternating "on" periods of at least about ninety percent while the microprocessor 116 is off, and with the microprocessor 116 retrieving data from the SIFO memory 118 during alternating on periods equal to no more than about ten percent while the data receiving mode by the analog front end block 112 is effectively disabled.

FIG. 3 illustrates a particular time-interleaved receiver architecture, according to the present invention, in which a timing controller 310 is arranged to control the timing of the data receiving mode by the analog front end block, the timing of the write and read modes of a SIFO memory 318, and the timing of a digital baseband block 320. As illustrated, the analog front end block includes both an analog receiver front-end 312 and an analog-to-digital converter 314. The arrangement of FIG. 3 can be used for a number of applications, including each of those applications discussed above.

FIG. 4 illustrates a particular time-interleaved transmitter architecture, according to the present invention, in which a timing controller 410 is arranged to control the timing of the data transmitting mode by the analog front end block, the timing of the write and read modes of a FISO memory 418, and the timing of a digital baseband block 420. As illustrated, the analog front end block includes both an analog transmitter front-end 412 and a digital-to-analog converter 414. The arrangement of FIG. 4 can be used for a number of applications, including each of those applications discussed above.

In yet another implementation of the present invention, the time-interleaved receiver and transmitter architectures are used together for duplex communication applications. One such application includes the time-interleaved receiver architecture of FIG. 3 being used to capture sensitive radio data, such as GPS data, and the time-interleaved transmitter architecture of FIG. 4 being used to report processed forms of such data to a user in response to selected events or user commands. The functionality of the illustrated shown in FIGS. 3 and 4 can operate in parallel with an additional controller circuit coordinating the receiving and transmitting (and/or reporting) operations, or, alternatively, a number of the illustrated functional blocks can operate using one or more shared processors. For example, the timing controllers 310 and 410 and the digital baseband blocks 320 and 420 can be implemented using one or two shared digital signal processors.

FIG. 5 is another receiver block diagram for use with a GPS system, depicting yet another example embodiment of the present invention. More particularly, the arrangement of FIG. 5 illustrates an example synchronizer architecture 500 having multiple similarly-constructed channel blocks, e.g. five channel blocks 508, 510, 512, 514 and 516, and an execution unit 518. Each of these channel blocks searches concurrently for different satellites' codes on an IF signal channel 522. Each channel block processes the received data through in-phase and quadrature paths to generate correlation data. Using a digital phase-locked loop implementation, the execution unit 518 receives output data from the channel blocks and calculates and detects correlation peaks, Doppler frequency shifts, and phase offsets. The execution unit 518 also provides number-controlled oscillator ("NCO") values to each channel block to maintain synchronization and, via output port 528, determines and provides the raw GPS data as an output signal.

To generate correlation data, each channel block includes mixers 530 and 540 to mix the received data to baseband in-phase and quadrature values. These values are resampled using digital interpolators 532 and 542 to remove any Doppler shift, and two matched filter type correlators 534 and 544 then convolve the signals with a local reference ("C/A") code.

The matched filter architecture of FIG. 5 can be implemented in any of a number of ways. For further information concerning details of such an architecture, reference may be made to a paper by W. Namgoong and T. Meng, entitled, "Power Consumption of Parallel Spread Spectrum Correlator Architectures," Int'l Symposium on Low Power Electronics and Design, pp. 133–135, August 1998. A copy of this paper is attached hereto and fully incorporated herein by reference.

Figure 6:
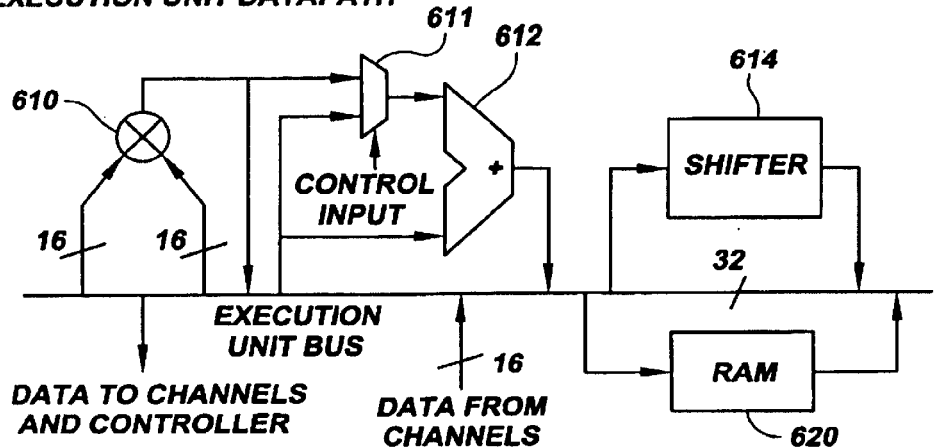
FIG. 6 is a block diagram of an example execution unit that can be implemented in connection with the receiver shown in FIG. 5, according to another example embodiment of the present invention.

FIG. 6 shows that the execution unit 518 of FIG. 5 can be implemented, according to the present invention, as a generic processing unit (run by program code—not shown) having a multiplier 610, a multiplexer 611 (with a control input that responds to the current state of the program code), an adder 612, a shifter 614 and a memory 620. The data path can be clocked at a rate that is sufficiently fast to allow processing of more channels than are used, for example, up to twelve channels.

As mentioned previously, the present invention is applicable to systems such as TDMA or disc-drive reading implementations where the time division between analog and digital circuitry can be accomplished without any loss of analog data, and also to implementations where the time division between analog and digital circuitry can be permitted with some loss of analog data. Where partial loss of analog data is acceptable, the degree of loss can be adjusted by selecting the fraction of one timing cycle for which the digital circuitry is operated.

Figure 7A:
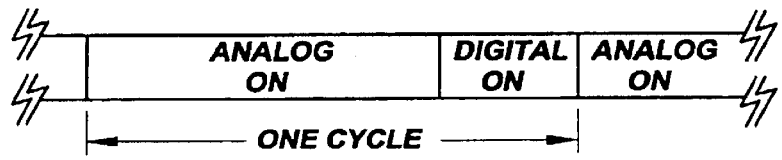
FIGS. 7a, 7b, 7c and 7d are timing diagrams illustrating example signal partitioning scheme, as may be used in connection with various implementations of the present invention.
Figure 7B:
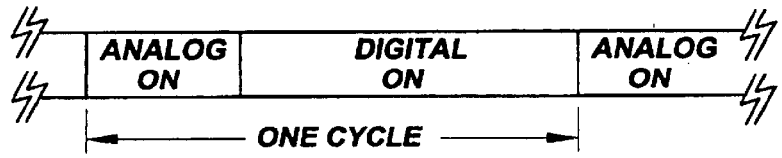

FIGS. 7a through 7d comprise four timing diagrams illustrating example signal partitioning schemes, as may be used in connection with various implementations of the present invention. As discussed above, these variations can be implemented, depending on the application at hand, with some loss of analog data or without any loss of analog data. In FIG. 7a, the signal communication is depicted with one cycle of data including a relatively high analog duty cycle along with a relatively low digital duty cycle. In FIG. 7b, the signal communication is depicted with one cycle of data including a relatively high digital duty cycle along with a relatively low analog duty cycle.

Figure 7C:
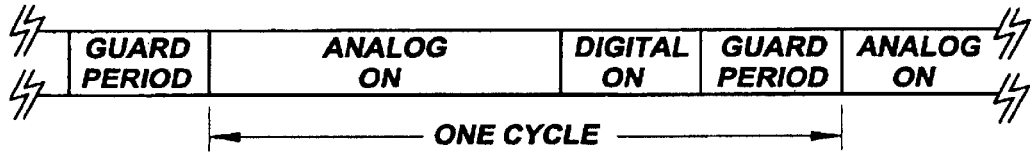
Figure 7D:

Many presently-defined communication schemes anticipate that the analog circuitry requires a period of time in which to settle and begin producing valid data. This is particularly true in analog systems with narrow band filters and/or frequency synthesizers. For this reason, a guard period is used between the digital and analog time slots, as illustrated in FIGS. 7c and 7d, which otherwise respectively correspond to FIGS. 7a and 7b in terms of similar duty cycle ratios. This approach is applicable to many TDMA systems, including those that also use TDD (time division duplexing), such as DECT, North American Digital Cellular (NADC), and Universal Mobile Telecommunications System (UMTS). In accordance with example implementations of the present invention, this guard period is used as the period during which the digital processing circuitry is activated and the processing of analog data is effectively disabled. In this manner, the time division between analog and digital circuitry can be accomplished without any loss of analog data. Ideally, the guard period should be of sufficient duration, relative to the processing speed of the digital circuitry, to permit the digital processing circuitry sufficient time to process the data completely before the guard period ends. For certain applications in which some loss of data is permitted, this guard period is used in the same manner, only with the digital processing circuitry continuing to process the data slightly after the guard period ends.

The present invention is applicable to a variety of systems, examples of which are discussed below. According to a number of implementations directed to different types of systems, the timing controller is adapted to control the analog and digital circuit sections for processing of data during the guard periods and/or the assignment of time slots to the analog and digital circuits. This circuit permits a flexible assignment of time slots and adaptiveness in that assignment, thereby enabling a dynamic tradeoff between power consumption and the length of the digital time slot. In a TDMA system, because there are multiple time slots in each frame, a user can be assigned one time slot during which a communication occurs. The analog section can be operated during the specified time slot, and then the digital section can be run to communicate during the other time slots. Thus, in such a situation, the digital portion could be readily slowed down to reduce power consumption. If there are seven users, for example, the digital portion has about seven times as long to process its data.

In a GSM system, there are eight user time-slots per frame for each GSM channel. A GSM frame is 4.615 milliseconds duration and each time slot is 576.92 microseconds duration, which is sufficient for 156.25 bits.

The DECT system uses TDMA and time division duplexing (TDD), so that a single user also receives and transmits during separate time slots. There are twenty-four time slots in a DECT frame, thereby allowing twelve duplex users. The frame length is 10 milliseconds, and a single time slot is 417 microseconds (or 480 bits). PACS supports either TDD or FDD, includes eight time slots per frame with the frame duration being 2.5 milliseconds and the time slot duration being 312.5 microseconds (120 bits).

In a TDD system, a single user consumes an entire channel, but alternates between transmitting and receiving (often but not necessarily at the same frequency). Such alternating inhibits the transmitter from drowning out the receiver.

In the NADC standard, which is also TDMA and FDD, the guard time is typical. In a 40 ms frame, there are six 6.67 ms time slots, and 1.85 ms of each time slot is used as a guard time between the transmit and receive slots for a given receiver. This allows a digital section to run three times faster than the date rate to process data during the guard period.

In a CDMA spread spectrum system, partial loss of analog data may in some cases be permissible and this loss of data in performance can be traded off against the power consumption of the digital circuitry and the size of the memory array. For example, such applications include spread spectrum systems with low data rates and high processing gains, such as GPS, because high processing gains make the system more forgiving of partial loss of the analog signal.

In a frequency-hopping spread spectrum system, partial loss of analog data can be at least partially avoided by using the guard time occurring between frames on different frequencies.

In an example embodiment of the transmit portion of a direct-sequence spread spectrum CDMA system, the transmitter sends data continuously (including when the digital section is running when there is no guard time available for the operation of the digital section). In this implementation, the general block diagram of FIG. 2 can be altered to include a multiplier between the memory 118 and the analog front end 212, with a second input to the multiplier being an output of a DS CDMA code generator block.

The IS-95 standard is also directed to a DS CDMA system with continuous access to a single code channel. While the time-interleaving method of the present invention may not be applicable to all modes of the standard, the IS-95 standard does have lower data rate modes in which time slots are unused. One implementation of the present invention is directed to using one or more of these unused time slots to run the digital section.

For further information concerning the operation of such system standards, reference may be made to T. Rappaport, *Wireless Communications: Principles and Practice*, Prentice Hall PTR, Upper Saddle River, N.J. 1996, and to B. Razavi, *RF Microelectronics*, Prentice Hall PTR, Upper Saddle River, N.J. 1998. Each of these publications is incorporated by reference in their entirety.

For other implementations, applications, features and details relating to the present invention, reference may be made to the paper entitled "method of Reducing Electrical Noise in Mixed Signal Systems," dated Sep. 9, 1998, attached hereto as an appendix and incorporated herein by reference in its entirety.

The various embodiments described above are provided by way of illustration only and should not be construed to limit the invention. Those skilled in the art will readily recognize various modifications and changes which may be made to the present invention without strictly following the exemplary embodiments and applications illustrated and described herein. For example, the present invention can be used with a single-chip radio transmitter where the analog portion is a modulator and power amplifier, and the digital portion is a DSP unit that provides the transmit data. The present invention can be implemented in non-monolithic manner, for example using a multi-chip module and/or printed circuit board, where the analog and digital functions can be collected into distinct chips with the memory facilitating communication between chips and/or the separate boards. Such variations do not depart from the true spirit and scope of the present invention which is set forth in the following claims.

What is claimed is:

1. In a communication arrangement having analog circuitry and having digital signal processing circuitry clocked sufficiently fast to generate noise, the analog circuitry susceptible to processing corrupted data due to the noise coupled thereto, a method for reducing noise passed from the digital signal processing circuitry, comprising the steps of:
   using the analog circuitry to capture information data from an incoming stream for a first time interval while the digital signal processing circuitry is in a reduced-activity mode; and
   in a mode other than the reduced-activity mode occurring during a known guard time for the data being communicated to the communication arrangement and during a second shorter time interval, clocking the digital signal processing circuitry to permit digital signal processing of the captured information data.

2. A method for reducing noise passed from the digital signal processing circuitry, according to claim 1, further including the step of providing both the analog circuitry and the digital signal processing circuitry on the same chip, and wherein the step of using the analog circuitry to process data includes receiving the data in the form of low-energy data.

3. A method for reducing noise passed from the digital signal processing circuitry, according to claim 1, wherein the step of using the analog circuitry to process data includes receiving the data in the form of low-energy data and storing the data in a memory circuit.

4. A method for reducing noise passed from the digital signal processing circuitry, according to claim 3, further including inhibiting the analog circuitry from storing data in a memory circuit.

5. A communication arrangement having analog circuitry and digital signal processing circuitry, the analog circuitry susceptible to processing corrupted data due to noise coupled thereto via digital signal processing circuitry, an arrangement for reducing noise passed from the digital signal processing circuitry, comprising:
   means for using the analog circuitry to process data during a first data-communication interval while the digital signal processing circuitry is in a reduced activity mode; and
   means for effectively disabling the processing of data by the analog circuitry during a second shorter data-communication interval and during a known guard time for the data being communicated to the communication arrangement while processing the data with the digital signal processing circuitry.

6. A communication arrangement, according to claim 5, further including a single chip carrying the analog circuitry and the digital signal processing circuitry.

7. A communication arrangement, according to claim 5, further including a memory circuit arranged to store data processed by the analog circuitry while the digital signal processing circuitry is in a reduced activity mode.

8. A communication arrangement, according to claim 7, wherein the memory circuit is part of the means for using the analog circuitry to process data while the digital signal processing circuitry is in a reduced activity mode.

9. A communication arrangement, according to claim 7, wherein the memory circuit is distinct from the means for using the analog circuitry to process data while the digital signal processing circuitry is in a reduced activity mode.

10. A communication arrangement, according to claim 5, wherein the means for using the analog circuitry to process data while the digital signal processing circuitry is in a reduced activity mode includes means for receiving low-energy, high-frequency data.

11. A communication arrangement, according to claim 5, wherein the means for using the analog circuitry to process data while the digital signal processing circuitry is in a reduced activity mode includes means for transmitting data.

12. A communication arrangement susceptible to processing corrupted data due to noise coupled thereto via high-speed data processing, comprising:
   a chip including both digital signal processing circuitry and analog circuitry, the digital signal processing circuitry having a reduced activity mode and a high-speed data processing mode, and the analog circuitry configured and arranged to capture and process data during a first data-communication interval while the digital signal processing circuitry is in the reduced activity mode; and
   means for effectively disabling the capture and processing of data by the analog circuitry during a known guard time for the data being communicated to the communication arrangement and during a second shorter data-communication interval while processing the data with the digital signal processing circuitry.

13. A communication arrangement, according to claim 12, wherein the chip further includes the means for effectively disabling the processing of data.

14. A communication arrangement, according to claim 12, wherein digital signal processing circuitry and analog circuitry are configured and arranged to receive data.

15. A communication arrangement, according to claim 12, wherein digital signal processing circuitry and analog circuitry are configured and arranged to receive and transmit data.

16. A communication arrangement, according to claim 12, wherein both digital signal processing circuitry and analog circuitry are configured and arranged to transmit data.

17. In a communication arrangement having analog circuitry and digital signal processing circuitry, the analog circuitry coupled to receive streams of data presented thereto in the form of high-frequency signals for subsequent processing by the digital signal processing circuitry, a method for reducing noise passed from the digital signal processing circuitry to the data, comprising the steps of:

using the analog circuitry to process and to store the data during a first data-communication interval while the digital signal processing circuitry is in a reduced activity mode; and disregarding additional data in the streams of data presented to the analog circuitry during a known guard time for the data being communicated to the communication arrangement and during a second shorter data-communication interval while processing the stored data with the digital signal processing circuitry.

18. In a communication arrangement having analog circuitry and digital signal processing circuitry, the analog circuitry coupled to receive streams of data presented thereto in the form of high-frequency signals for subsequent processing by the digital signal processing circuitry, a method for reducing noise passed from the digital signal processing circuitry to the data, comprising the steps of:

using the analog circuitry to capture, process and to store the data during a first data-communication interval while the digital signal processing circuitry is in a reduced activity mode; and disregarding additional data in the streams of data presented to the analog circuitry during a known guard time for the data being communicated to the communication arrangement and during a second shorter data-communication interval while processing the stored data with the digital signal processing circuitry.

19. A communication arrangement susceptible to processing corrupted data due to noise coupled thereto by high-speed data processing, comprising:

a chip including both digital signal processing circuitry and analog circuitry, the digital signal processing circuitry having a reduced activity mode and a high-speed data processing mode, and the analog circuitry configured and arranged to process data during a first data-communication interval while the digital signal processing circuitry is in the reduced activity mode; and means for effectively disabling the processing of data by the analog circuitry during a known guard time for the data being communicated to the communication arrangement and during a second shorter data-communication interval while processing the data with the digital signal processing circuitry.

20. A communication arrangement, according to claim 19, wherein the analog circuitry processes data while the digital signal processing circuitry is in the reduced activity mode for at least ninety percent of a time period, and the digital signal processing circuitry processes the data for no more than the remaining portion of the time period.

21. A radio communication arrangement in which data is received using assigned frames with guard periods defined between the frames, the radio communication arrangement being susceptible to processing corrupted data due to noise coupled thereto by high-speed data processing, comprising:

a circuit including both digital signal processing circuitry and analog circuitry, the digital signal processing circuitry having a reduced activity mode and a high-speed data processing mode, and the analog circuitry configured and arranged to process data while the digital signal processing circuitry is in the reduced activity mode; and a timer controller for causing, during the guard period, the processing of data by the analog circuitry to be effectively disabled and the digital signal processing circuitry to process the data.

22. A radio communication arrangement, according to claim 21, wherein the reduced activity mode includes at least one of: removed power to the digital signal processing circuitry; removed power to selected circuits forming part of the digital signal processing circuitry; and reduced clock speeds driving various circuits that form part of the digital signal processing circuitry.

\* \* \* \* \*

UNITED STATES PATENT AND TRADEMARK OFFICE
CERTIFICATE OF CORRECTION

PATENT NO. : 6,963,626 B1
APPLICATION NO. : 09/310598
DATED : November 8, 2005
INVENTOR(S) : Shaeffer et al.

It is certified that error appears in the above-identified patent and that said Letters Patent is hereby corrected as shown below:

On Title Page

Under (75) Inventors: "K. Derek Schaeffer" should read --Derek K. Schaeffer--.

Col. 1, lines 15-19: delete duplicate "BACKGROUND STATEMENT".

Col. 11, line 15: "method of Reducing" should read --Method of Reducing--.

Signed and Sealed this

Twenty-eighth Day of November, 2006

JON W. DUDAS
*Director of the United States Patent and Trademark Office*